United States Patent
Choi et al.

(10) Patent No.: US 10,917,020 B2
(45) Date of Patent: Feb. 9, 2021

(54) MULTI OUTPUT DC/DC CONVERTER AND METHOD FOR CONTROLLING THE SAME

(71) Applicants: Hyundai Motor Company, Seoul (KR); Kia Motors Corporation, Seoul (KR); Inha University Research and Business Foundation, Incheon (KR)

(72) Inventors: Jae Hyuk Choi, Seoul (KR); Byeong Seob Song, Gyeonggi-do (KR); Sam Gyun Kim, Gyeonggi-do (KR); Jae Kuk Kim, Incheon (KR); Bom Seok Lee, Gyeongsangbuk-do (KR); Jae Hyun Ahn, Incheon (KR)

(73) Assignees: Hyundai Motor Company, Seoul (KR); Kia Motors Corporation, Seoul (KR); Inha University Research and Business Foundation, Incheon (KR)

( * ) Notice: Subject to any disclaimer, the term of this patent is extended or adjusted under 35 U.S.C. 154(b) by 0 days.

(21) Appl. No.: 16/675,460

(22) Filed: Nov. 6, 2019

(65) Prior Publication Data
US 2020/0382009 A1    Dec. 3, 2020

(30) Foreign Application Priority Data
May 27, 2019    (KR) .......................... 10-2019-0061896

(51) Int. Cl.
*H02M 3/335* (2006.01)
*H02M 3/28* (2006.01)
(Continued)

(52) U.S. Cl.
CPC ....... *H02M 3/33576* (2013.01); *H02M 1/083* (2013.01); *H02M 3/285* (2013.01); *H02M 3/33561* (2013.01); *H02M 2001/009* (2013.01)

(58) Field of Classification Search
CPC .......... H02M 2001/009; H02M 3/285; H02M 3/33561
(Continued)

(56) References Cited

U.S. PATENT DOCUMENTS 6,498,734 B1 * 12/2002 Nishide ............. H02M 3/33561
                                                                363/21.04
7,298,116 B2 * 11/2007 Sluijs .................... H02M 3/155
                                                                323/222
(Continued)

FOREIGN PATENT DOCUMENTS

KR    10-2006-0047903 A    5/2006
KR    10-2009-0102949 A    10/2009

*Primary Examiner* — Gary A Nash
(74) *Attorney, Agent, or Firm* — Mintz Levin Cohn Ferris Glovsky and Popeo, P.C.; Peter F. Corless

(57) ABSTRACT

A multi output DC/DC converter includes a transformer having a primary side winding connected to an input side and a secondary side winding connected to an output side; a rectifying diode for rectifying an output of the secondary side winding; an output inductor having a first end connected to the rectifying diode; and a first output switching element and a second output switching element each having first ends connected to a second end of the output inductor, where a second end of the first output switching element and a second end of the second output switching element become first and second output stages outputting different voltages, respectively.

11 Claims, 12 Drawing Sheets

(51) Int. Cl.
*H02M 1/08* (2006.01)
*H02M 1/00* (2006.01)

(58) Field of Classification Search
USPC .................. 323/267, 272; 363/21.04, 21.06
See application file for complete search history.

(56) References Cited

U.S. PATENT DOCUMENTS

| | | | |
|---|---|---|---|
| 2006/0220591 A1* | 10/2006 | Marchand | H02M 3/33561 |
| | | | 315/209 R |
| 2010/0283322 A1* | 11/2010 | Wibben | H05B 45/327 |
| | | | 307/31 |
| 2010/0295472 A1* | 11/2010 | Wibben | H05B 45/46 |
| | | | 315/294 |
| 2012/0155119 A1* | 6/2012 | Kim | H02M 3/33592 |
| | | | 363/17 |
| 2018/0006557 A1* | 1/2018 | Yoon | H02M 3/07 |
| 2018/0092179 A1* | 3/2018 | Guo | H02M 3/156 |

* cited by examiner

MULTI OUTPUT DC/DC CONVERTER AND METHOD FOR CONTROLLING THE SAME

CROSS REFERENCE TO RELATED APPLICATION

The present application claims under 35 U.S.C. § 119(a) the benefit of Korean Patent Application No. 10-2019-0061896 filed May 27, 2019, the entire contents of which are incorporated by reference herein.

BACKGROUND

(a) Technical Field

The present disclosure relates to a multi output DC/DC converter and a method for controlling the same, more particularly, to the multi output DC/DC converter capable of outputting multiple voltages without adding an inductor in an output stage.

(b) Description of the Related Art

The power consumed in a vehicle has been increasing due to the development of vehicle safety and self-driving technology, etc. In addition, the development of a mild hybrid vehicle is underway to improve fuel efficiency by regulation of carbon dioxide emissions.

As a vehicle power supply increases, there is a growing interest in a vehicle electrical system, and the vehicle industry has proposed an electrical system using a voltage of about 48V as an alternative to a conventional 12V electrical system. In this regard, research and development has been conducted on a vehicle that uses the conventional 12V electrical system and a 48V electrical system simultaneously, and in particular, a DC/DC converter capable of simultaneously charging a 12V battery and a 48V battery.

In a typical vehicle, a low voltage DC/DC converter (LDC), which is a power conversion part of the vehicle, makes it possible to manufacture at low cost even while having high power density and high efficiency. For this reason, an active clamp forward (ACF) converter may be utilized in order to reduce the number of switches compared to a full-bridge converter, enable a zero voltage switching (ZVS), and reduce the size of the output inductor.

In the conventional converter circuit, in order to simultaneously output 12V, which is the output voltage of the low voltage DC/DC converter, and 48V, which is a new vehicle output voltage, a method for boosting the output voltage to obtain the 48V through the connection of the serial boost circuit to the 12V output stage has been used.

This conventional method has an advantage of using the general DC/DC converter generating the 12V output, but has a disadvantage in that the number of output inductors increases due to an inductor being present in a boost circuit for the 48V output, the boost circuit being used to obtain the multi output of the 12V and 48V.

The foregoing explained as the background is intended merely to aid in the understanding of the background of the present disclosure, and is not intended to mean that the present disclosure falls within the purview of the related art that is already known to those skilled in the art.

SUMMARY

Therefore, an object of the present disclosure is to provide a multi output DC/DC converter capable of outputting multiple voltages without adding an inductor in an output stage and a method for controlling the same.

The present disclosure discloses a multi output DC/DC converter including a transformer having a primary side winding connected to an input side and a secondary side winding connected to an output side; a rectifying diode for rectifying the output of the secondary side winding; an output inductor having a first end connected to the rectifying diode; and a first output switching element and a second output switching element each having first ends connected to a second end of the output inductor, where a second end of the first output switching element and a second end of the second output switching element become first and second output stages outputting different voltages, respectively In an embodiment of the present disclosure, the first output switching element and the second output switching element can be mutually and complementarily turned on and off.

In an embodiment of the present disclosure, the first output switching element and the second output switching element can be MOSFETs.

In an embodiment of the present disclosure, the voltage of the second output stage can be greater than the voltage of the first output stage, the first output switching element can be a MOSFET, and the second output switching element can be a diode.

In an embodiment of the present disclosure, the multi output DC/DC converter can further include a controller for regulating the duties of the first output switching element and the second output switching element based on the magnitudes of the load currents required at the first output stage and the second output stage.

In an embodiment of the present disclosure, the controller can set the sum of the magnitude of the load current required at the first output stage and the magnitude of the load current required at the second output stage to the output current instruction, and can control the magnitude of the current applied to the primary side winding so that the magnitude of the current of the output inductor follows the output current instruction.

In an embodiment of the present disclosure, the controller can control the ON/OFF of the first output switching element by determining the ratio occupied by the magnitude of the load current required at the first output stage from the magnitude of the current of the output inductor at the duty of the first output switching element, and can complementarily control the ON/OFF of the second output switching element and the first output switching element.

As another means for achieving the object, the present disclosure provides a method for controlling a multi output DC/DC converter including, in the method for controlling the above-described multi output DC/DC converter, setting the output current instruction based on the magnitudes of the load currents required at the first output stage and the second output stage; comparing the current of the output inductor with the output current instruction; controlling the current of the primary side winding of the transformer so that the current of the output inductor follows the output current instruction; and determining the duties of the first output switching element and the second output switching element based on the magnitudes of the current of the output inductor and the load current required at the first output stage and the second output stage and controlling the ON/OFF of the first output switching element and the second output switching element according to the determined duties.

In an embodiment of the present disclosure, the controlling the ON/OFF can mutually and complementarily control the ON/OFF of the first output switching element and the second output switching element.

An embodiment of the present disclosure can further include sensing the current flowing through the load connected to the first output stage and the current flowing through the load connected to the second output stage, and the setting can include setting the output current instruction based on the current sensed in the sensing.

In an embodiment of the present disclosure, the setting can including setting the sum of the magnitudes of the load currents required at the first output stage and the second output stage according to the output current instruction.

In an embodiment of the present disclosure, the magnitude of the current applied to the primary side winding can be controlled so that the magnitude of the current of the output inductor follows the output current instruction.

In an embodiment of the present disclosure, the controlling the ON/OFF can control the ON/OFF of the first output switching element by determining the ratio occupied by the magnitude of the load current required at the first output stage from the magnitude of the current of the output inductor at the duty of the first output switching element, and can complementarily control the ON/OFF of the second output switching element and the first output switching element.

According to the multi output DC/DC converter and the method for controlling the same, it is possible to output a plurality of voltages (e.g., 12V and 48V) through one output inductor, thereby reducing a size of the DC/DC converter by reducing the number of inductors, so as to achieve cost savings.

In addition, according to the multi output DC/DC converter and the method for controlling the same, it is possible to reduce the switching voltage of the output switching element, thereby reducing the switching loss.

The effects obtained by the present disclosure are not limited to the above-mentioned effects, and other effects not mentioned can be clearly understood by those skilled in the art to which the present disclosure pertains from the following description.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-of", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, a multi output DC/DC converter and a method for controlling the same according to various embodiments of the present disclosure will be described in detail with reference to the accompanying drawings.

Figure 1:
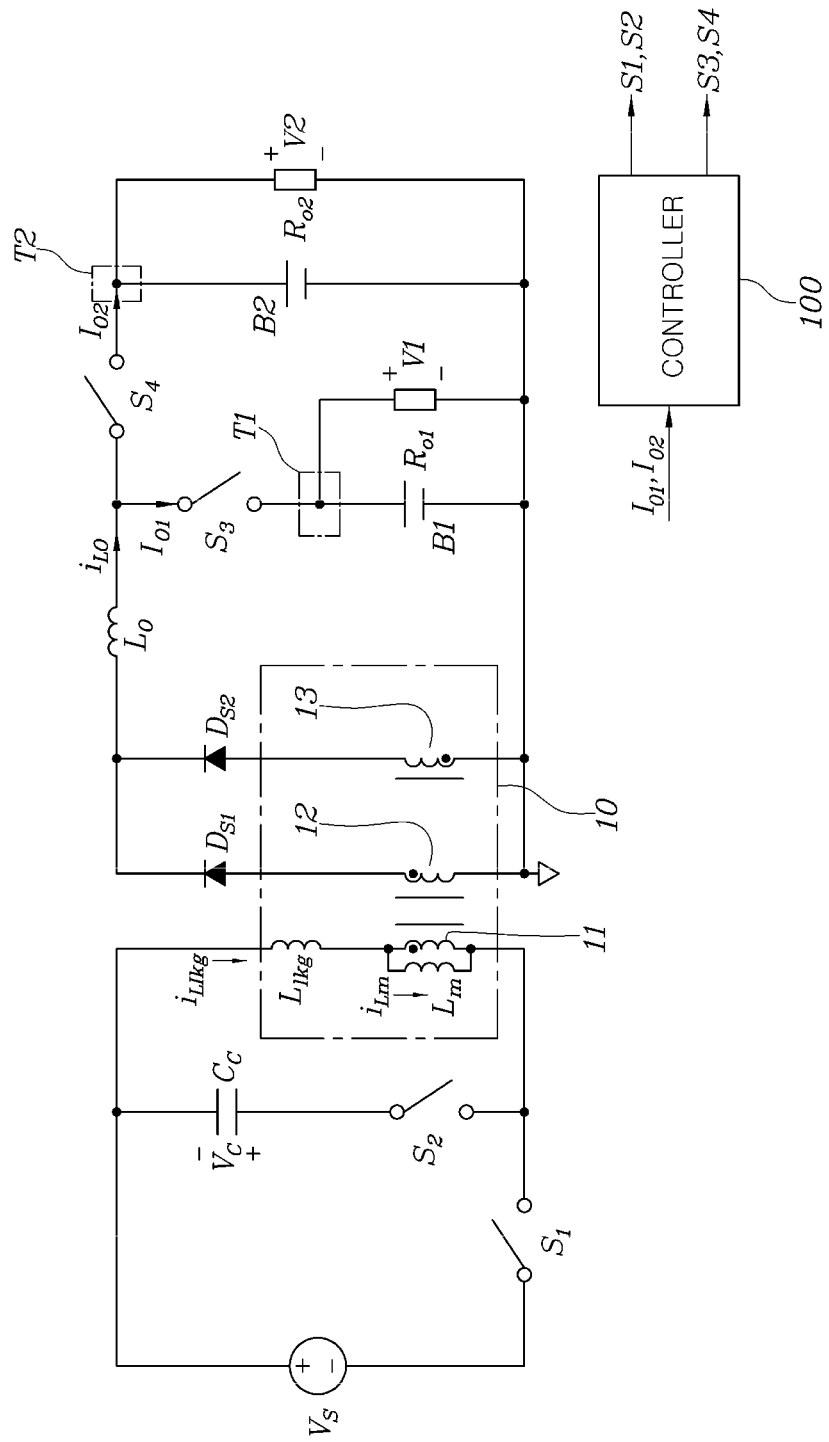
FIG. 1 is a circuit diagram showing a multi output DC/DC converter according to an embodiment of the present disclosure.

FIG. 1 is a circuit diagram showing a multi output DC/DC converter according to an embodiment of the present disclosure.

Referring to FIG. 1, a multi output DC/DC converter according to an embodiment of the present disclosure can be configured to include a transformer 10 having a primary side winding 11 connected to an input side and secondary side windings 12, 13 connected to an output side, rectifying diodes $D_{s1}$, $D_{s2}$ for rectifying the output of the secondary side windings 12, 13, an output inductor $L_O$ having a first end connected to the rectifying diodes $D_{s1}$, $D_{s2}$, and a first output switching element $S_3$ and a second output switching element $S_4$ each having a first end connected to a second end of the output inductor $L_O$. Herein, a second end of the first output switching element $S_3$ and a second end of the second output switching element $S_4$ can be output stages of the multi output DC/DC converter. In the case that an embodiment of the present disclosure is a DC/DC converter for a vehicle that simultaneously charges 12V and 48V batteries B1, B2 or provides power to loads $R_{O1}$, $R_{O2}$ using each voltage, each output stage, that is, the second end of the first output switching element $S_3$ and the second end of the second output switching element $S_4$ can be connected with the batteries B1, B2 and the loads $R_{O1}$, $R_{O2}$.

In addition, the multi output DC/DC converter according to an embodiment of the present disclosure can further include a controller 100 for sensing the output current and regulating the duties of the first output switching element $S_3$ and the second output switching element $S_4$ based on the magnitude of load currents $I_{O1}$, $I_{O2}$ required at each output stage.

A primary side circuit of the multi output DC/DC converter shown in FIG. 1, that is, a circuit that is implemented between the input stage to which an input voltage $V_s$ to be transformed is applied and a primary side winding 11 of the transformer 10 is, for example, shown by the topology of an active clamp forward converter, but it can be replaced with other topologies such as a full bridge converter and a flyback converter known in the art.

The secondary side winding 12 of the transformer 10 can be connected with the rectifying diode $D_{S1}$ and the secondary side winding 13 can be connected with the rectifying diode $D_{S2}$. More specifically, the dot-side terminal of the secondary side winding 12 of the transformer 10 can be connected with the anode terminal of the rectifying diode $D_{S1}$, and the undot side terminal of the secondary side winding 13 of the transformer 10 can be connected with the anode terminal of the rectifying diode $D_{S2}$. The cathode terminals of the rectifying diodes $D_{s1}$, $D_{s2}$ can be connected to the first end of the output inductor $L_O$, and the second end of the output inductor $L_O$ can be connected to the first end of the first output switching element $S_3$ and the first end of the second output switching element $S_4$. The second end of the first output switching element $S_3$ can be a first output stage T1 of the DC/DC converter connected with the positive (+) terminal of the 12V battery B1 and the 12V load $R_{O1}$, and the second end of the second output switching element $S_4$ can be a second output stage T2 of the DC/DC converter connected with the positive (+) terminal of the 48V battery and the 48V load $R_{O2}$.

The controller 100 can set the instruction of the output current required for the output stage and perform the Pulse Width Modulation (PWM) for the switching elements $S_1$, $S_2$ of the input side and the switching elements $S_3$, $S_4$ of the output side according to the instruction of the output current. For example, the controller 100 can set a value obtained by summing the output currents required at the first output stage and the second output stage as an output current instruction, and control ON/OFF by determining the duty of the input side (primary side) switch according to the result of comparing the sum of the current detection values detected by current sensors (not shown) provided at the first output stage T1 and the second output stage T2 with the current instruction. In addition, the controller 100 can control ON/OFF by determining the duties of the first output switching element $S_3$ and the second output switching element $S_4$ according to the output currents required at the first output stage and the second output stage T1, T2, respectively.

In the active clamping forward converter, the switching elements $S_1$, $S_2$ of the input side (primary side) can be mutually and complementarily controlled. In addition, in the multi output DC/DC converter according to an embodiment of the present disclosure, the first output switching element $S_3$ and the second output switching element $S_4$ can also be mutually and complementarily controlled. That is, the second output switching element $S_4$ can be turned off when the first output switching element $S_3$ is turned on, and the second output switching element $S_4$ can be turned on when the first output switching element $S_3$ is turned off. When the first output switching element $S_3$ is in the ON state, the current of the output inductor $L_O$ can flow to the first output stage T1 to charge the 14V battery B1, and when the second output switching element $S_4$ is in the ON state, the current of the output inductor $L_O$ can flow to the second output stage T2 to charge the 48V battery B2.

Figure 2:
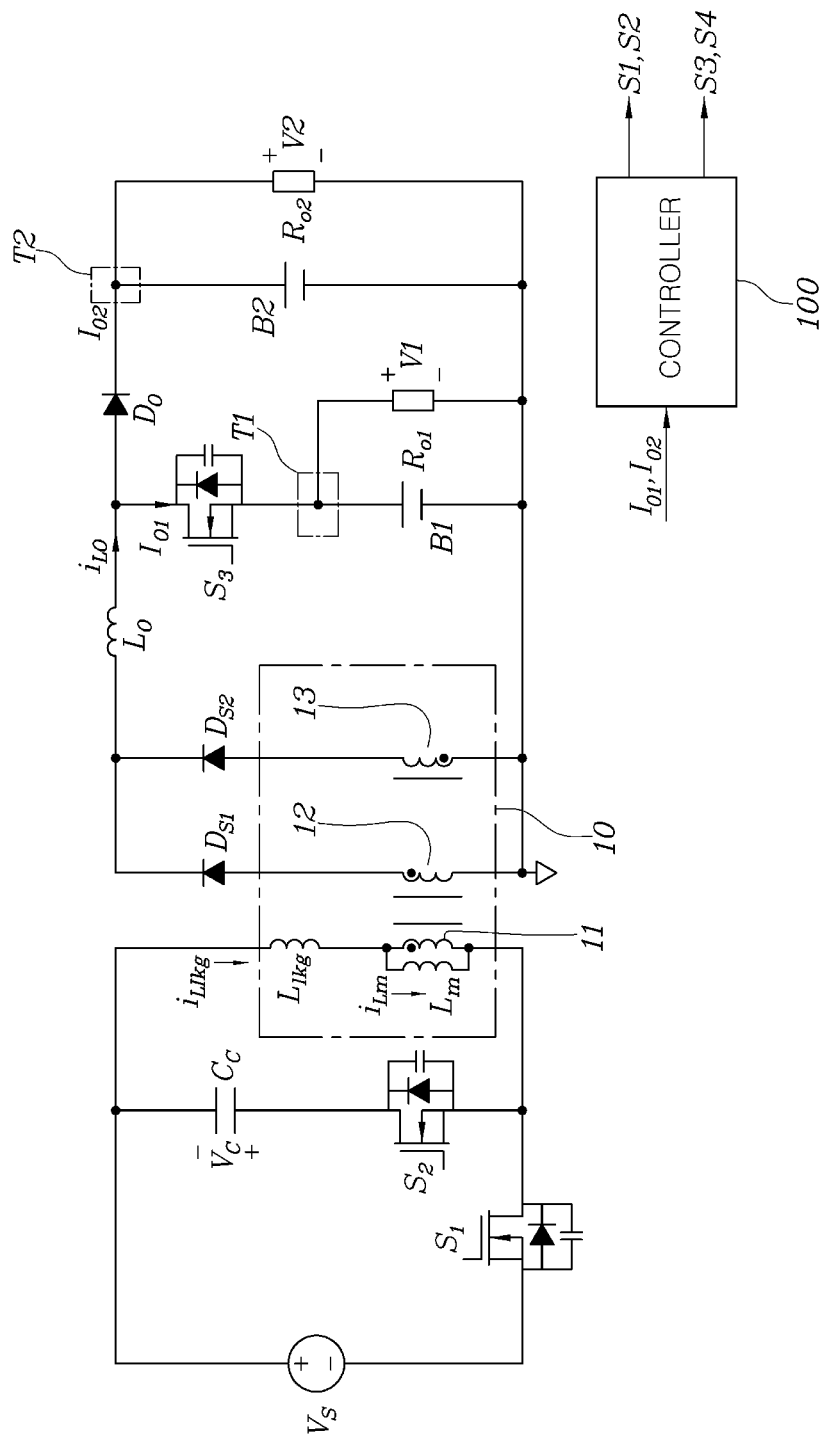
FIGS. 2 and 3 are circuit diagrams of the multi output DC/DC converter according to various other embodiments of the present disclosure.
Figure 3:
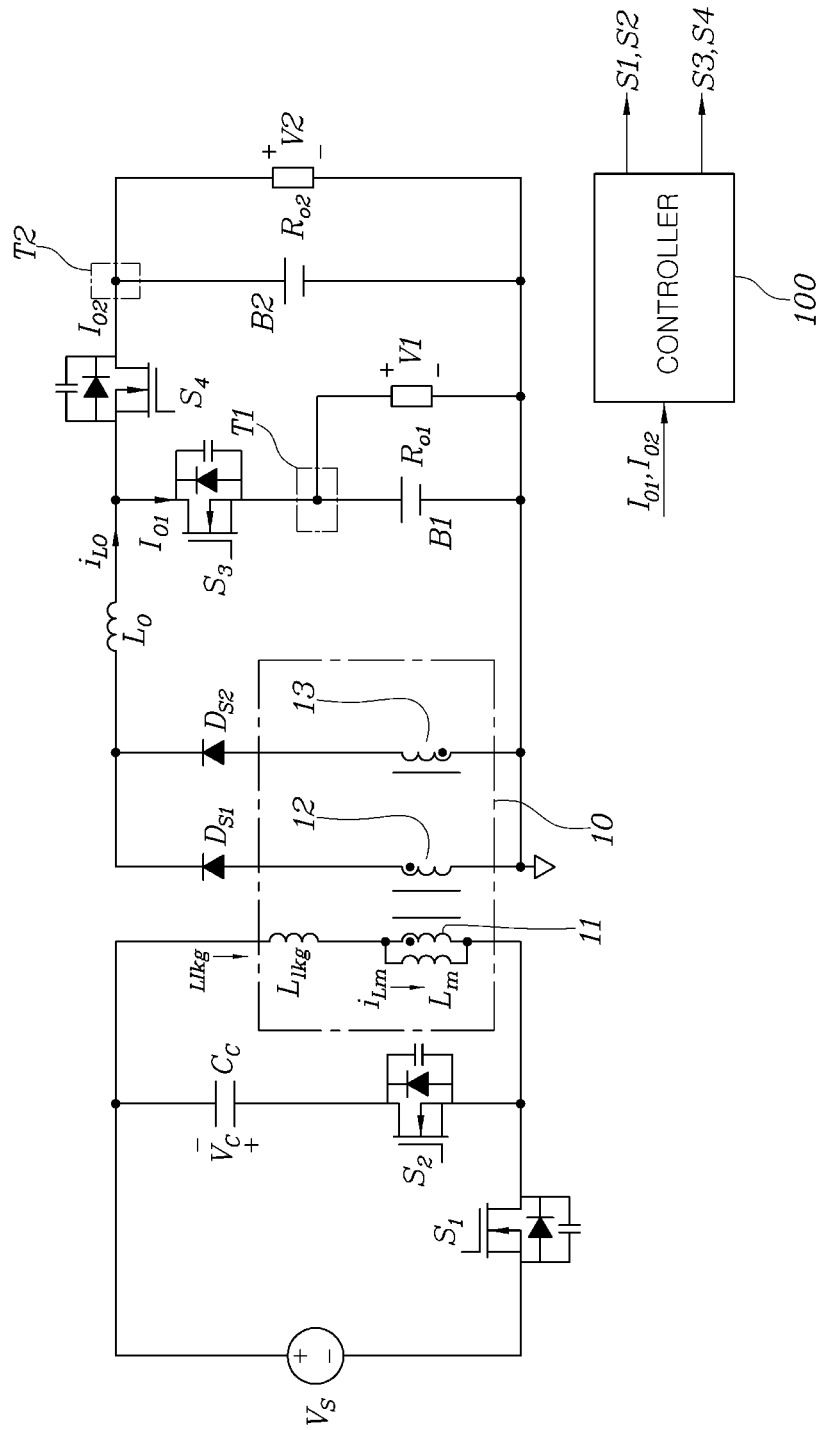

FIGS. 2 and 3 are circuit diagrams of the multi output DC/DC converter according to various other embodiments of the present disclosure.

In FIGS. 2 and 3, the input side (primary side) circuit shows an example of an active clamping forward circuit in which the switching elements $S_1$, $S_2$ are all implemented by using a MOSFET switch.

In an embodiment of FIG. 2, the first output switching element $S_3$ is implemented as a MOSFET switch, while the second output switching element $S_4$ is implemented as a diode. In an embodiment of FIG. 3, both the first output switching element $S_3$ and the second output switching element $S_4$ are implemented as a MOSFET switch.

In an embodiment of FIG. 2, the positive (+) terminal of the input voltage $V_s$, the negative (−) terminal of a clamping capacitor $C_c$, and a first end of the primary side winding 11 of the transformer 10 can be connected in common. The positive (+) terminal of the clamping capacitor $C_C$ can be connected with the drain terminal of the switching element $S_2$. In addition, the source terminal of the switching element $S_2$ can be connected with a second end of the primary side winding 11 of the transformer 10 and the source terminal of the switching element $S_1$. The drain terminal of the switching element $S_1$ can be connected with the negative (−) terminal of the input voltage $V_s$.

In the secondary side circuit of an embodiment shown in FIG. 2, the secondary side windings 12, 13 of the transformer 10 can be connected with the rectifying diodes $D_{s1}$, $D_{s2}$, respectively. In particular, the dot-side terminal of the secondary side winding 12 of the transformer can be connected with the anode terminal of the rectifying diode $D_{s1}$, and the undot side terminal of the secondary side winding 13 of the transformer 10 can be connected with the anode terminal of the rectifying diode $D_{S2}$.

The cathode terminals of the rectifying diodes $D_{s1}$, $D_{s2}$ can be connected to a first end of the output inductor $L_O$, and the second end of the output inductor $L_O$ can be connected to the drain terminal of the first output switching element $S_3$ and the anode of the diode $D_o$ that is the second output switching element $S_4$. The source terminal of the first output switching element $S_3$ can be the first output stage T1 of the DC/DC converter connected with the positive (+) terminal of the 12V battery B1 and the 12V load $R_{O1}$, and the cathode of the diode $D_O$ that is the second output switching element $S_4$ can be the second output stage T2 of the DC/DC converter connected with the positive (+) terminal of the 48V battery and the 48V load $R_{O2}$.

The negative (−) terminals of the batteries B1, B2 connected to the first output stage T1 and the second output stage T2, respectively, can be grounded to the same ground as the secondary side windings 12, 13 of the transformer 10.

In an embodiment shown in FIG. 3, the input side (primary side) can be the same as an embodiment shown in FIG. 2. In addition, an embodiment shown in FIG. 3 applies a MOSFET as the second output switching element $S_4$ instead of the diode $D_O$ shown in FIG. 2. Therefore, the cathode terminals of the rectifying diodes $D_{s1}$, $D_{s2}$ can be connected to a first end of the output inductor $L_O$, and the second end of the output inductor $L_O$ can be connected to the drain terminal of the first output switching element $S_3$ and the drain terminal of the second output switching element $S_4$. The source terminal of the first output switching element $S_3$ can be the first output stage T1 of the DC/DC converter connected with the positive (+) terminal of the 12V battery B1 and the 12V load $R_{O1}$, and the source terminal of the second output switching element $S_4$ can be the second output stage T2 of the DC/DC converter connected with the positive (+) terminal of the 48V battery and the 48V load $R_{O2}$.

Figure 4:
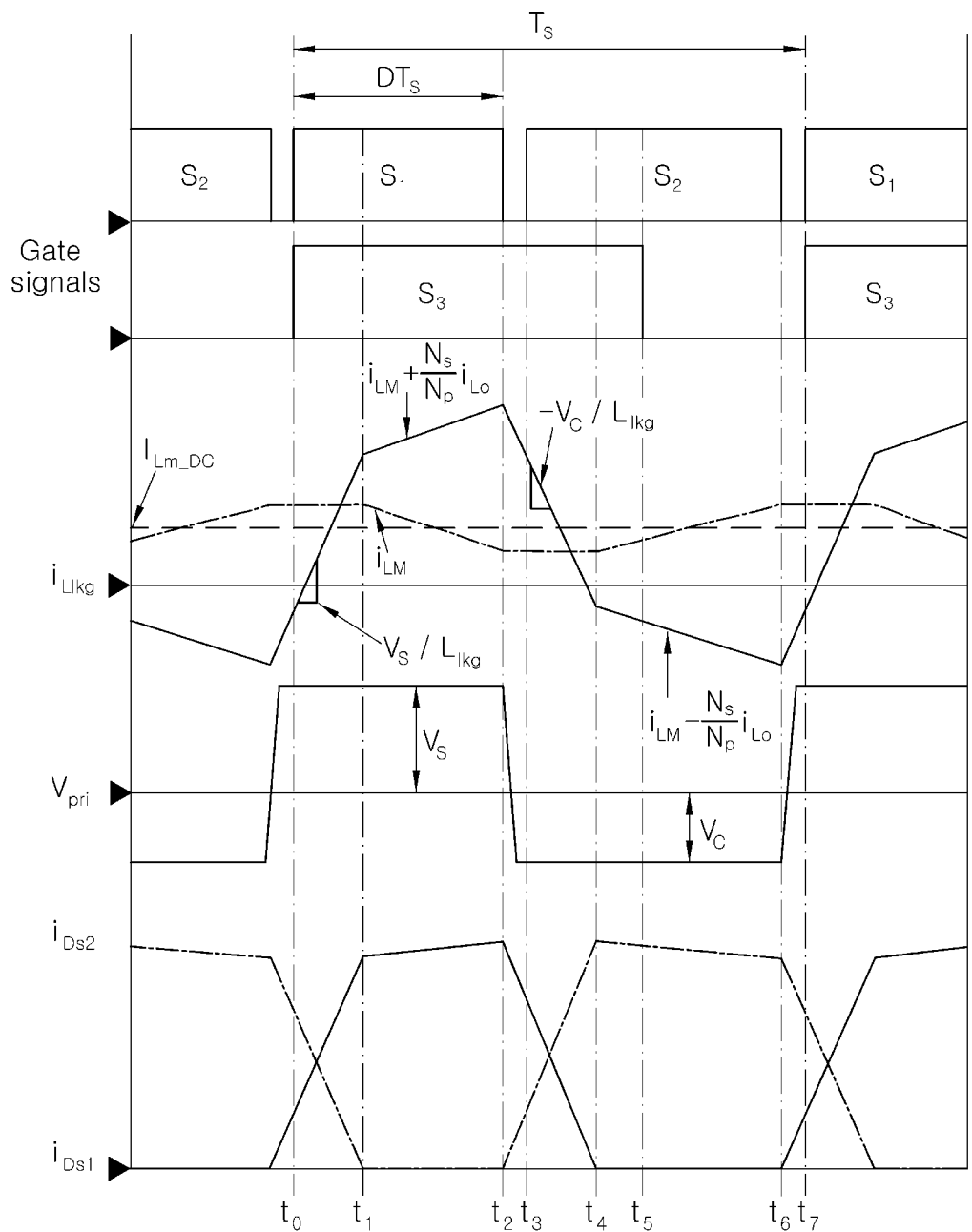
FIG. 4 is an operational waveform diagram of the multi output DC/DC converter according to an embodiment of the present disclosure.

FIG. 4 is an operational waveform diagram of the multi output DC/DC converter according to an embodiment of the present disclosure. In addition, FIGS. 5 to 11 are circuit diagrams for explaining the operation of the multi output DC/DC converter according to an embodiment of the present disclosure in each time zone shown in FIG. 4.

An embodiment applied to FIGS. 4 to 11 is an embodiment shown in FIG. 2. In an embodiment of FIG. 2, the second output switching element $S_4$ is implemented as the diode $D_o$, and when the first output switching element $S_3$ is in the OFF state, it becomes a conduction state where a current flows through the diode $D_0$, and when the first output switching element $S_3$ is in the ON state, it becomes a state where a current flows to the first output stage T1 and the current does not flow through the diode $D_O$. That is, the conduction state of the diode $D_0$ appears to be complementary to the conduction state of the first output switching element $S_3$.

The waveform shown in FIG. 4 is an example of the operation in which the input voltage $V_s$ is 240V, and as the output, 1400 W is output to the 12V output stage (first output stage T1) and 2000 W is output to the 48V output stage (second output stage T2), respectively. The switch $S_1$ of the input side (primary side) and the first output switching element $S_3$ can be turned on simultaneously, and the switches $S_1$, $S_2$ of the input side (primary side) can be turned on/off in the mutually complementary relationship, and the first output switching element $S_3$ and the second output switching element $S_4$ can also be turned on/off in the complementary relationship. $i_{Llkg}$ and $i_{Lm}$ refer to the leakage current and magnetizing current of the transformer 10, respectively, and the directions of the currents are shown in FIGS. 5 to 11. $V_{pri}$ refers to the voltage applied to the primary side winding 11 of the transformer 10, and $i_{Ds1}$ and $i_{Ds2}$ refer to the currents flowing through the rectifying diodes $D_{S1}$, $D_{S2}$ and their directions are shown in FIGS. 5 to 11.

FIGS. 5 to 11 show the operation and current flow of the converter circuit at each time interval $t_0$ to $t_7$ of FIG. 4, and this time interval is to divide one cycle into 7 in total by setting as one cycle from the time point when the switch $S_1$ is turned on to the time point when it is next turned on.

Figure 5:
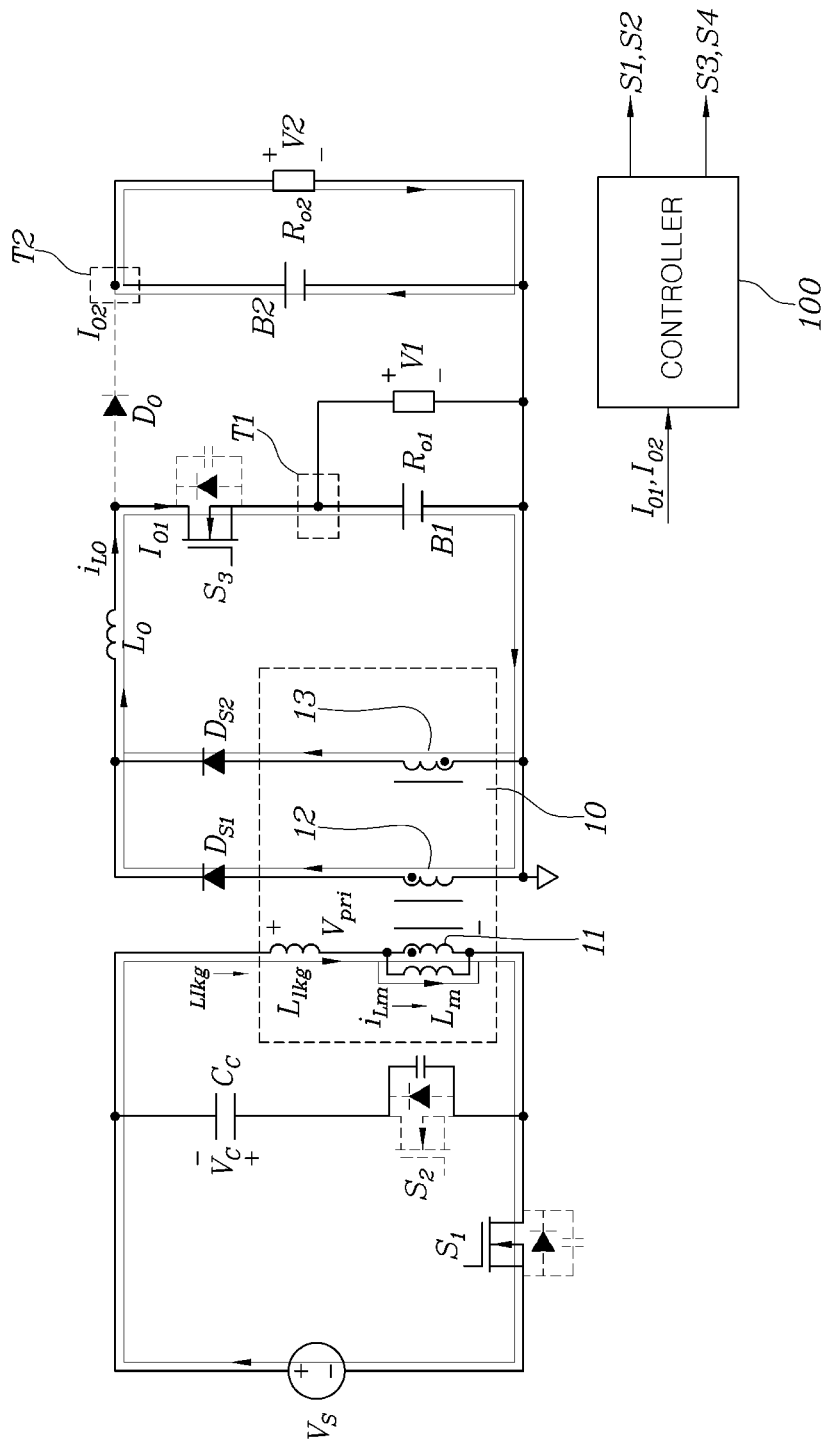
FIGS. 5 to 11 are circuit diagrams for explaining the operation of the multi output DC/DC converter according to an embodiment of the present disclosure in each time zone shown in FIG. 4.

Firstly, FIG. 5 shows the operation of the converter at the time interval between $t_o$ and $t_1$ of FIG. 4, and at $t_o$, the switch $S_1$ and the first output switching element $S_3$ are turned on, and the switch $S_1$ performs the Zero Voltage Switching turn-on operation. Since the rectifying diodes $D_{s1}$, $D_{s2}$ connected to the secondary side of the transformer 10 are in commutation, the leakage current of the transformer 10 continuously increases at the slope of '$V_s/L_{lkg}$,' and the magnetizing current is kept constant. In addition, since the first output switching element $S_3$ is in the ON state, the 12V battery B1 connected to the first output stage T1 is charged by the output inductor current $i_{LO}$, and the 48V battery connected to the second output stage T2 is discharged by the load $R_{O2}$.

Figure 6:
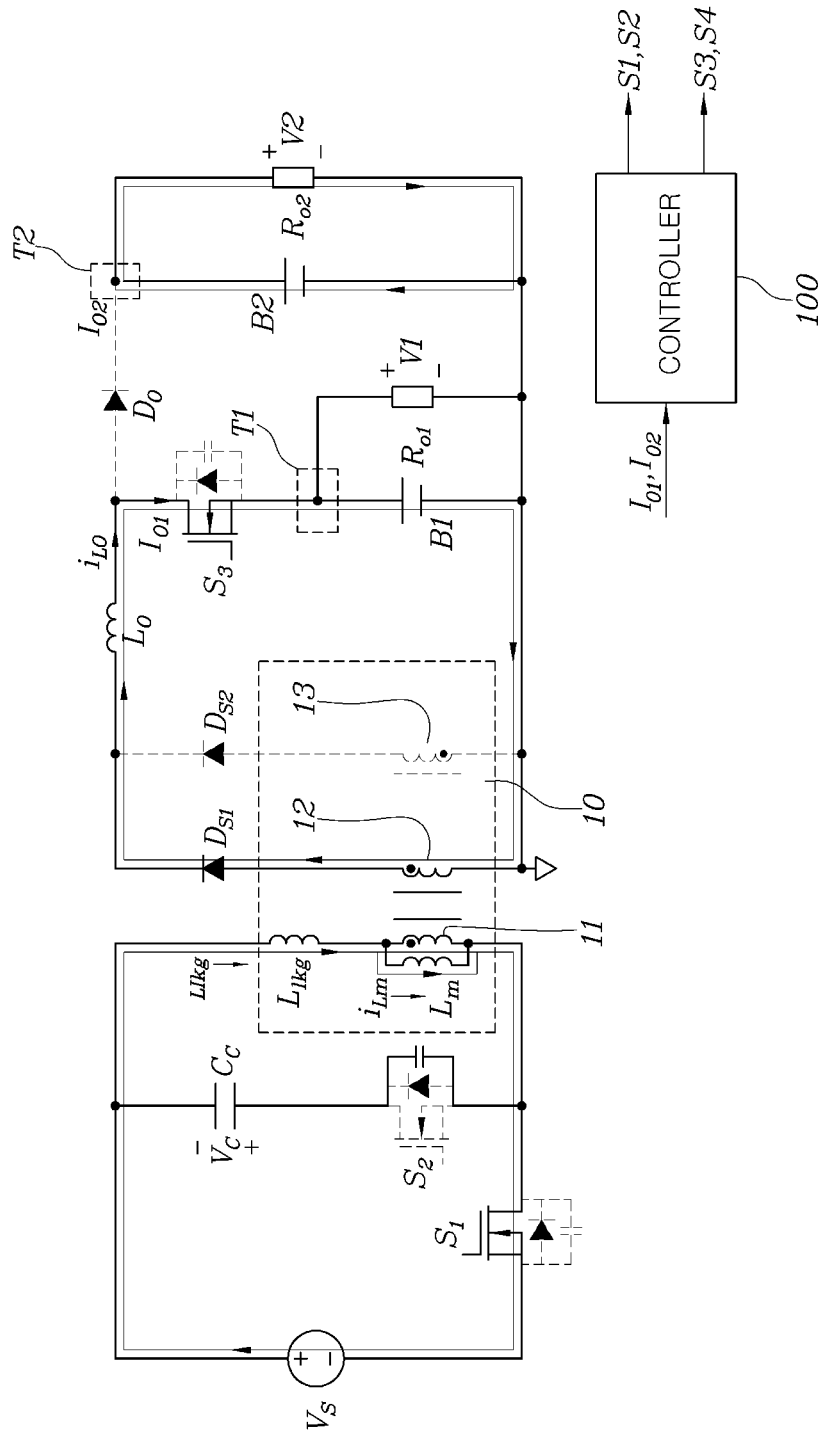

Next, FIG. 6 shows the operation of the converter at the time intervals between $t_1$ and $t_2$ of FIG. 4, and at $t_1$, the commutation of the rectifying diodes $D_{S1}$, $D_{S2}$ connected to the secondary side of the transformer 10 is terminated, and the first rectifying diode $D_{S1}$ operates in the ON state and the second rectifying diode $D_{S2}$ operates in the OFF state. The leakage current of the transformer 10 increases by reflecting the current of the output inductor $L_O$ to the magnetizing current. At the time point $t_2$, the primary side switch $S_1$ is turned off.

Figure 7:
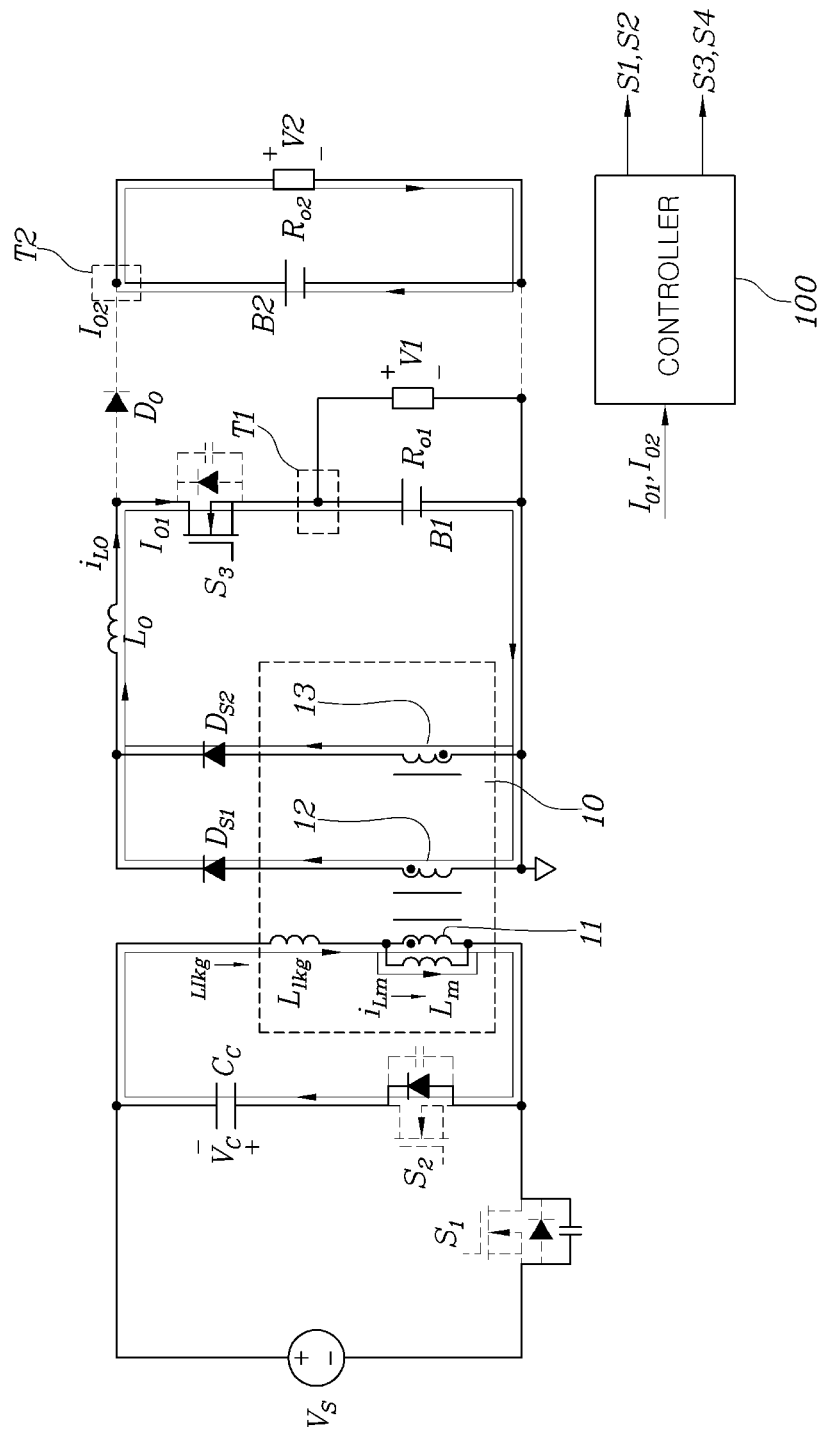

Next, FIG. 7 shows the operation of the converter at the time intervals between $t_2$ and $t_3$ of FIG. 4, and after the switch $S_1$ is turned off at the time point $t_2$, the rectifying diode $D_{S2}$ is turned off, and the commutation for turning on the rectifying diode $D_{S1}$ starts. While the switch $S_1$ is turned off, the voltage of the primary side winding 11 of the transformer 10 becomes '$-V_C$' because the voltage of the clamping capacitor Cc is applied as the reverse voltage from the input voltage $V_s$. Therefore, the leakage current of the transformer 10 reduces at the slope of '$-V_C/L_{lkg}$,' and flows through a body diode of the switch $S_2$.

Figure 8:
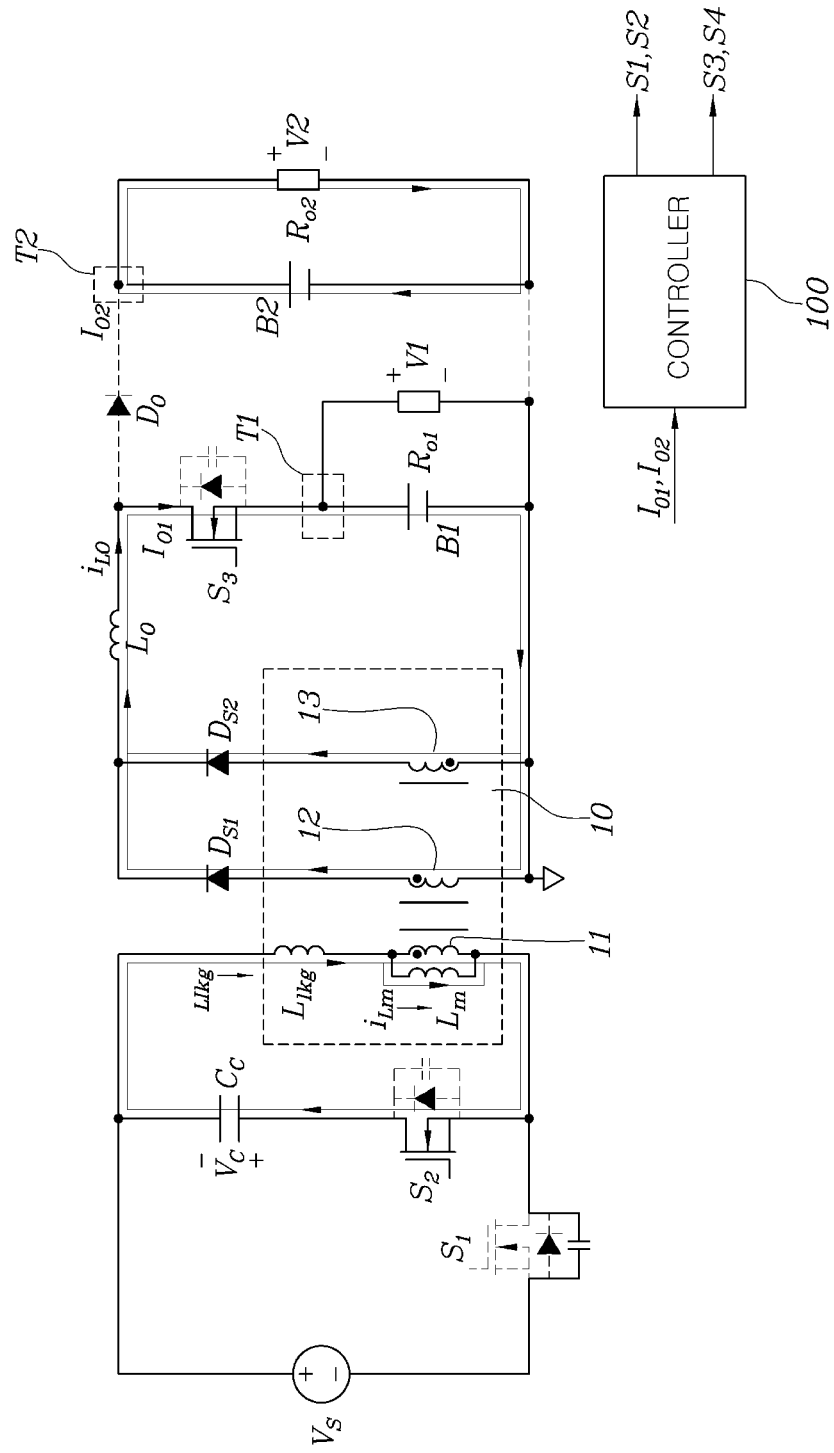

Next, FIG. 8 shows the operation of the converter at the time intervals between $t_3$ and $t_4$ of FIG. 4, and at $t_3$, the switch $S_2$ performs the Zero Voltage Switching turn-on operation. The leakage current of the transformer 10 continuously reduces so that the direction of the current is opposite. The $t_4$ is a time point when the commutation of the rectifying diodes $D_{S1}$, $D_{S2}$ connected to the secondary side of the transformer 10 is terminated.

Figure 9:
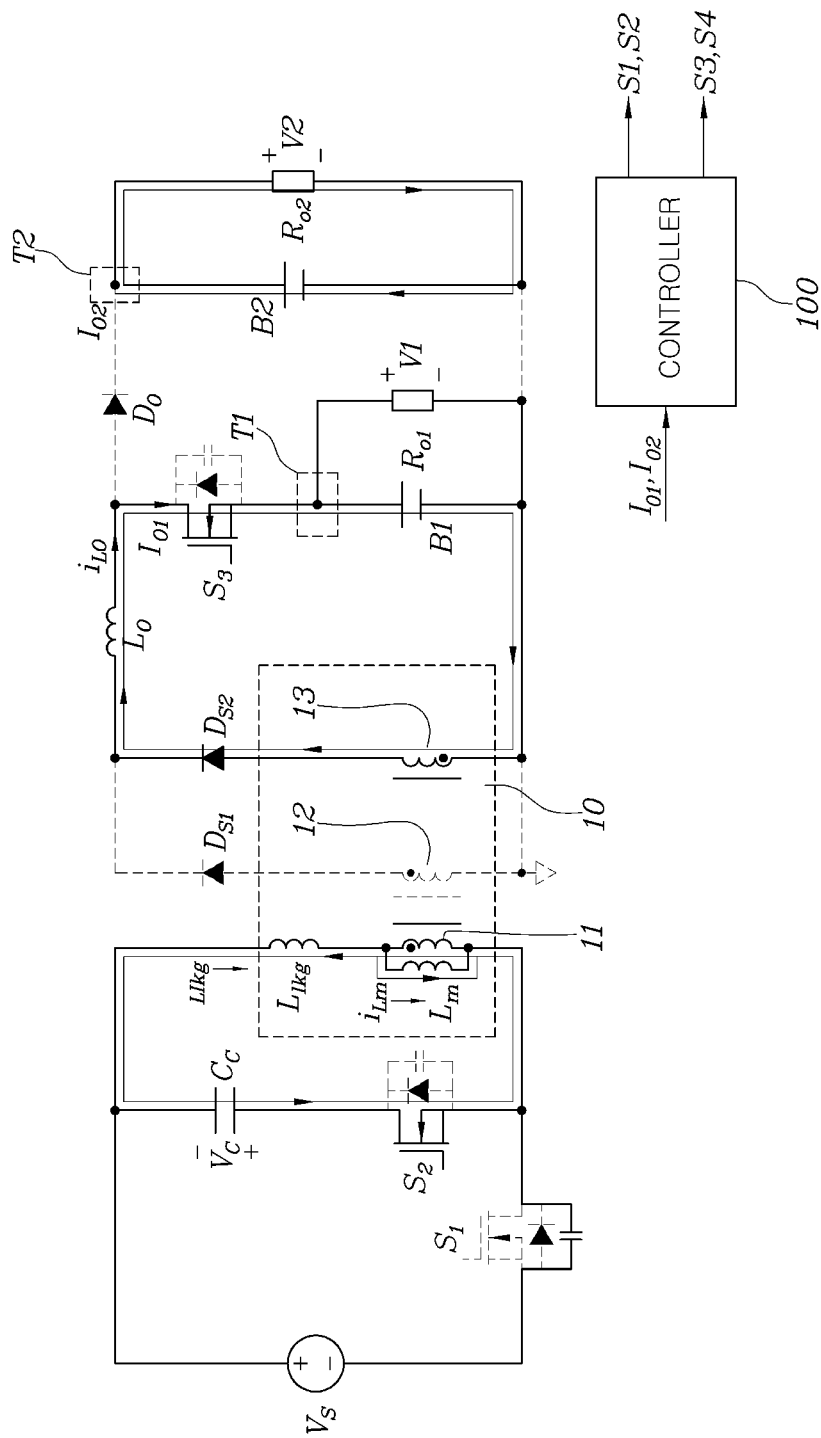

Next, FIG. 9 shows the operation of the converter at the time intervals between $t_4$ and $t_5$ of FIG. 4, and at $t_4$, when the commutation of the rectifying diodes $D_{S1}$, $D_{S2}$ connected to the secondary side windings 12, 13 of the transformer 10, respectively, is terminated, the rectifying diode $D_{s1}$ performs the OFF operation and the current of the secondary side of the transformer 10 flows through the rectifying diode $D_{S2}$. The current of the output inductor $L_O$ is reflected to the leakage current so that the magnitude of the leakage current continuously reduces.

Figure 10:
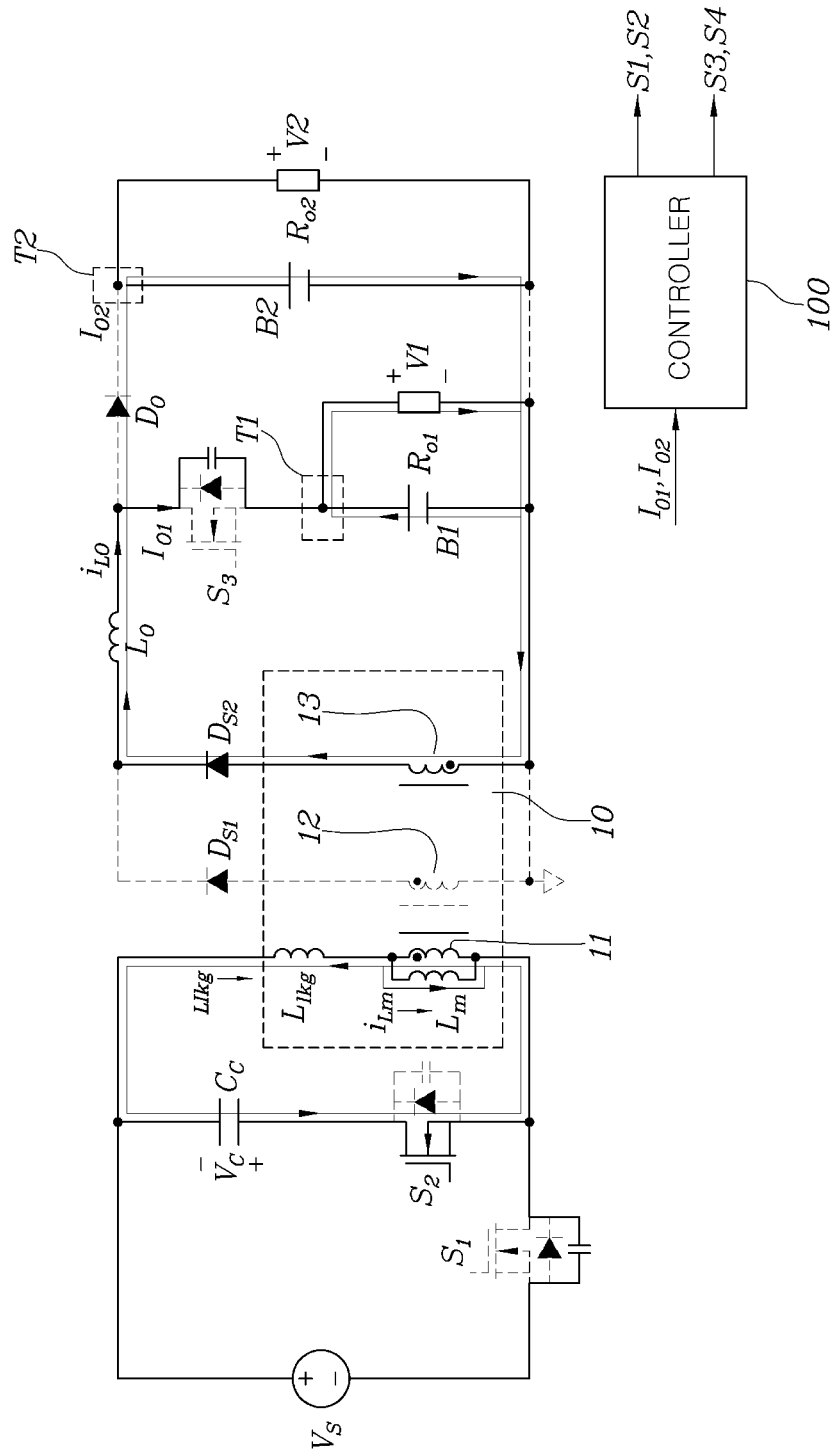

Next, FIG. 10 shows the operation of the converter at the time intervals between $t_5$ and $t_6$ of FIG. 4, and at $t_5$, the first output switching element $S_3$ is turned off, and the output diode $D_O$ connected with the 48V battery B2 is turned on. Therefore, the 14V battery is discharged and the 48V battery is charged by the current $i_{LO}$ of the output inductor $L_O$.

Figure 11:
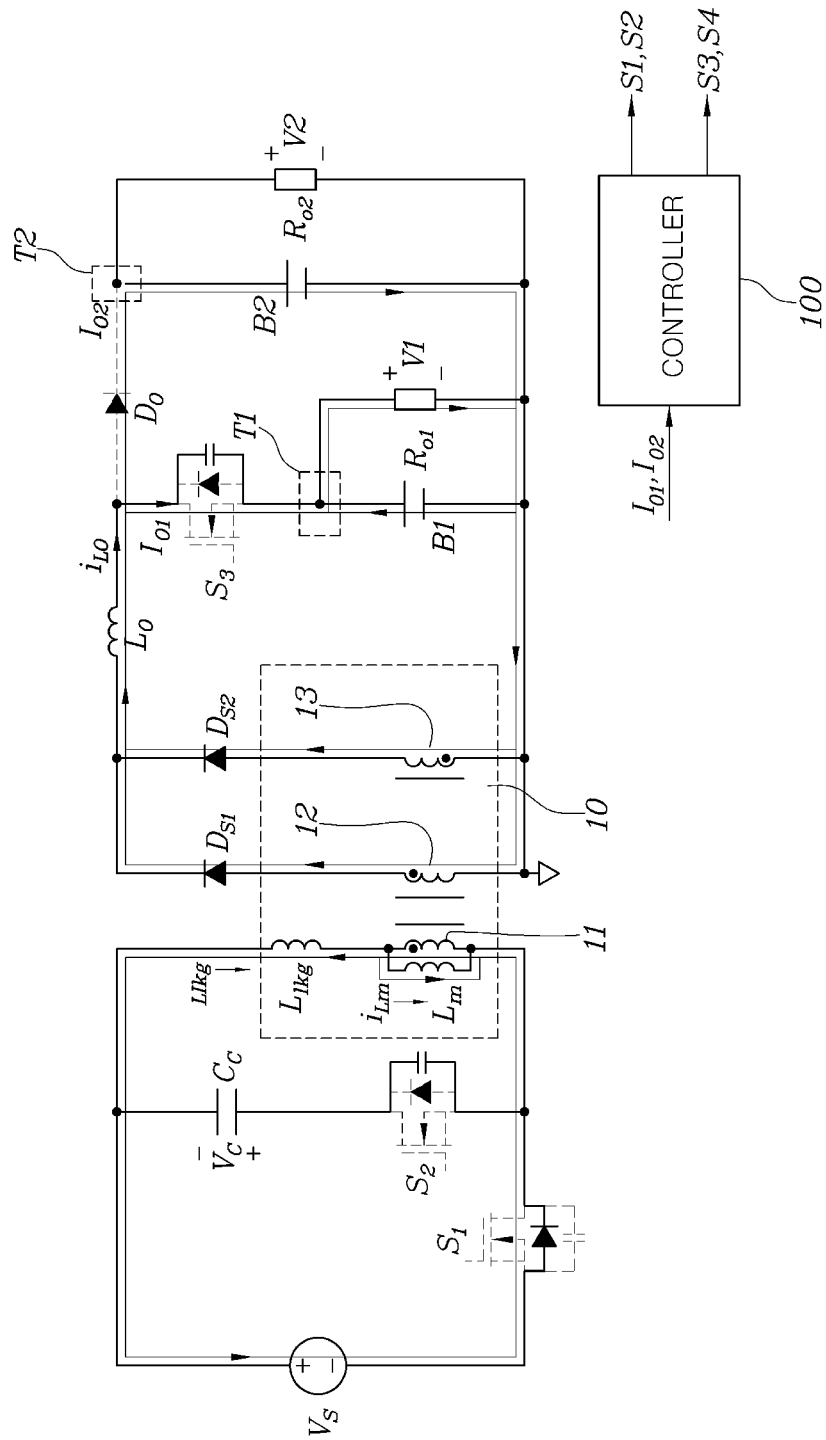

Next, FIG. 11 shows the operation of the converter at the time intervals between $t_6$ and $t_7$ of FIG. 4, and at $t_6$, the switch $S_2$ of the primary side is turned off and the voltage applied to the primary side of the transformer 10 is changed to the input voltage $V_s$ from the '$-V_C$.' The commutation of the rectifying diodes $D_{S1}$, $D_{S2}$ connected to the secondary side of the transformer 10 occurs, the current of the rectifying diode $D_{S2}$ starts to reduce to zero, and the current of the rectifying diode $D_{S1}$ increases. The leakage current starts to increase at the slope of '$V_s/L_{lkg}$,' and flows through the body diode of the switch $S_1$.

Figure 12:
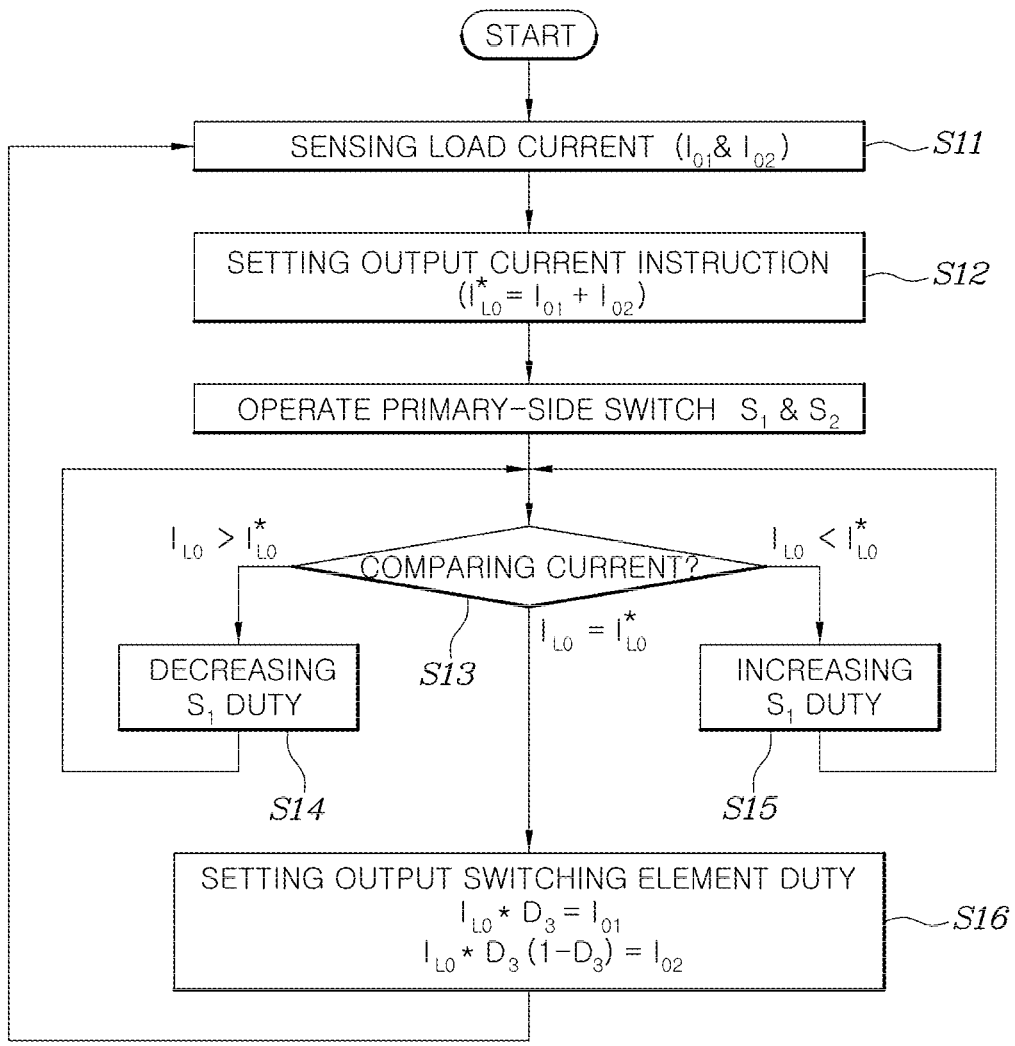
FIG. 12 is a flowchart showing a method for controlling the multi output DC/DC converter according to an embodiment of the present disclosure.

FIG. 12 is a flowchart showing a method for controlling the multi output DC/DC converter according to an embodiment of the present disclosure.

Referring to FIG. 12, a method for controlling the multi output DC/DC converter according to various embodiments of the present disclosure as described above can be configured to include setting the output current instruction of the DC/DC converter by the controller 100 (step S12), and controlling the output current by comparing the current of the output inductor $L_O$ and the output current instruction after operating the converter to control the primary side switches $S_1$, $S_2$ according to its result by the controller 100, and setting the duties of the output switching elements $S_3$, $S_4$ by the controller 100 (step S16).

In the setting the output current instruction $I_{LO^*}$ (step S12), the output current instruction $I_{LO^*}$ can be the sum of the output current required at the first output stage T1 to which the 12V battery B1 and the 12V load $R_{O1}$ are connected and the output current required at the second output stage T2 to which the 48V battery B2 and the 48V load $R_{O2}$ are connected.

In order to generate such an output current instruction $I_{LO^*}$, the controller 100 can receive the load current flowing through the 12V load $R_{O1}$ and the 48V load $R_{O2}$ with a value detected through a current sensor (not shown), and set the sum of the received two load currents according to the output current instruction $I_{LO*}$ (step S11). For another example, the controller 100 can also receive the magnitudes of the currents required for the 12V load $R_{O1}$ and the 48V load $R_{O2}$ from the upper controller (not shown).

Then, the controller 100 can determine the duties of the primary side switches $S_1$, $S_2$ so that the current of the magnitude corresponding to the output current instruction $I_{LO*}$ can flow through the output inductor $L_O$, and therefore, control the primary side switches $S_1$, $S_2$ in the pulse width modulation method for controlling the ON/OFF of the primary side switches $S_1$, $S_2$. The controller 100 can store in advance the duties of the primary side switches $S_1$, $S_2$ according to the magnitude of the output current instruction $I_{LO*}$.

Then, the controller 100 can compare the output current sensing value $I_{LO}$ that has sensed the current flowing through the output inductor $L_O$ with the output current instruction $I_{LO*}$ (step S13), and then when the output current sensing value $I_{LO}$ is greater than the output current instruction $I_{LO*}$, the duty of the primary side switch $S_1$ can be reduced (step S14), and when the output current sensing value $I_{LO}$ is smaller than the output current instruction $I_{LO*}$, the duty of the primary side switch $S_1$ can be increased (step S15).

Herein, the reducing the duty of the primary side switch $S_1$ is a control for reducing the magnitude of the current flowing through the primary side winding 11 of the transformer 10, and the increasing the duty of the primary side switch $S_1$ is a control for increasing the magnitude of the current flowing through the primary side winding 11 of the transformer 10. Although an embodiment of FIG. 12 has been described that the duty of the primary side switch $S_1$ is increased and reduced by taking the topology of the active clamping forward converter as an example, it is possible to increase and reduce the magnitude of the current flowing through the primary side winding 11 of the transformer 10 in another method in the case of a converter to which another topology is applied to another primary side. Of course, the inductor current sensing value $I_{LO}$ can be generated by a current sensor for sensing the current of the output inductor $L_O$, although not shown.

After controlling the current of the output inductor $L_O$ to be substantially equal to the output current instruction $I_{LO*}$ through the control of steps S13 to S15, the duties of the output switching elements $S_3$, $S_4$ can be set and therefore, the ON/OFF of the output switching elements $S_3$, $S_4$ can be controlled.

In FIG. 12, 'D$_3$' refers to the duty of the first output switching element $S_3$ and can be determined based on the required current to be output at the first output stage T1 upon generating the output current instruction $I_{LO*}$ of step S12 and the magnitude of the inductor current sensing value $I_{LO}$. That is, the duty of the first output switching element $S_3$ can be determined by a ratio occupied by the required current to be output at the first output stage T1 to the inductor current sensing value $I_{LO}$, and the controller 100 can perform the pulse width modulation for controlling the duties of the first output switching element $S_3$ and the second output switching element $S_4$ according to the determined duties.

As described above, the multi output DC/DC converter and the method for controlling the same according to various embodiments of the present disclosure can output the plurality of voltages (e.g., 12V and 48V) through one output inductor.

In addition, the multi output DC/DC converter and the method for controlling the same according to various embodiments of the present disclosure can reduce the switching voltage of the output switching element, thereby reducing the switching loss. That is, in the conventional case, the switching voltage of the output switching element for outputting the relatively high voltage corresponds to the high voltage to be outputted, but in various embodiments of the present disclosure, the value corresponding to the difference between the low voltage and the high voltage to be output can be determined by the switching voltage, thereby reducing the switching voltage. Therefore, it is possible to lower the switching voltage of the output switching element, thereby reducing the switching loss.

As described above, while it has been illustrated and described with respect to the specific embodiments of the present disclosure, it will be apparent by those skilled in the art that various improvements and changes of the present disclosure can be made within the scope of the claims.

What is claimed is:

1. A multi output DC/DC converter, comprising:
   a transformer having a primary side winding connected to an input side and a secondary side winding connected to an output side;
   a rectifying diode for rectifying an output of the secondary side winding;
   an output inductor having a first end connected to the rectifying diode;
   a first output switching element and a second output switching element each having first ends connected to a second end of the output inductor; and
   a controller for regulating duties of the first output switching element and the second output switching element based on magnitudes of load currents required at the first output stage and the second output stage,
   wherein a second end of the first output switching element and a second end of the second output switching element become first and second output stages outputting different voltages, respectively, and
   wherein the controller sets a sum of the magnitude of the load current required at the first output stage and the magnitude of the load current required at the second output stage according to an output current instruction, and controls a magnitude of a current applied to the primary side winding so that a magnitude of a current of the output inductor follows the output current instruction.

2. The multi output DC/DC converter according to claim 1, wherein the first output switching element and the second output switching element are mutually and complementarily turned on and off.

3. The multi output DC/DC converter according to claim 1, wherein the first output switching element and the second output switching element are MOSFETs.

4. The multi output DC/DC converter according to claim 1, wherein a voltage of the second output stage is greater than a voltage of the first output stage, the first output switching element is a MOSFET, and the second output switching element is a diode.

5. The multi output DC/DC converter according to claim 1, wherein the controller controls ON/OFF of the first output switching element by determining a ratio occupied by the magnitude of the load current required at the first output stage from a magnitude of a current of the output inductor at the duty of the first output switching element, and complementarily controls ON/OFF of the second output switching element and the first output switching element.

6. A method for controlling a multi output DC/DC converter, comprising:

providing the multi output DC/DC converter comprising:
- a transformer having a primary side winding connected to an input side and a secondary side winding connected to an output side;
- a rectifying diode for rectifying an output of the secondary side winding;
- an output inductor having a first end connected to the rectifying diode; and
- a first output switching element and a second output switching element each having first ends connected to a second end of the output inductor,
- wherein a second end of the first output switching element and a second end of the second output switching element become first and second output stages outputting different voltages, respectively;

setting an output current instruction based on magnitudes of load currents required at a first output stage and a second output stage;

comparing a current of the output inductor with the output current instruction;

controlling a current of the primary side winding of the transformer so that the current of the output inductor follows the output current instruction; and determining duties of the first output switching element and the second output switching element based on magnitudes of the current of the output inductor and the load current required at the first output stage and the second output stage and controlling ON/OFF of the first output switching element and the second output switching element according to the determined duties.

7. The method for controlling the multi output DC/DC converter according to claim 6, wherein controlling the ON/OFF mutually and complementarily controls ON/OFF of the first output switching element and the second output switching element.

8. The method for controlling the multi output DC/DC converter according to claim 6, further comprising sensing a current flowing through a load connected to the first output stage and a current flowing through a load connected to the second output stage, wherein setting the output current instruction includes setting the output current instruction based on the sensed current.

9. The method for controlling the multi output DC/DC converter according to claim 6, wherein setting the output current instruction includes setting a sum of the magnitudes of the load currents required at the first output stage and the second output stage according to the output current instruction.

10. The method for controlling the multi output DC/DC converter according to claim 9, wherein a magnitude of the current applied to the primary side winding is controlled so that a magnitude of the current of the output inductor follows the output current instruction.

11. The method for controlling the multi output DC/DC converter according to claim 6, wherein controlling the ON/OFF includes controlling the ON/OFF of the first output switching element by determining a ratio occupied by a magnitude of the load current required at the first output stage from a magnitude of the current of the output inductor at the duty of the first output switching element, and complementarily controls the ON/OFF of the second output switching element and the first output switching element.

\* \* \* \* \*